(12) United States Patent
Mugnai et al.

(10) Patent No.: US 11,721,111 B2
(45) Date of Patent: Aug. 8, 2023

(54) SYSTEMS AND METHODS FOR DETECTING OBJECTS IN AN IMAGE OF AN ENVIRONMENT

(71) Applicant: Verizon Connect Development Limited, Dublin (IE)

(72) Inventors: Tommaso Mugnai, Figline e Incisa Valdarno (IT); Douglas Coimbra De Andrade, Florence (IT); Giovanni Morini, Siena (IT); Andrea Basile, Corato (IT)

(73) Assignee: Verizon Connect Development Limited, Dublin (IE)

( * ) Notice: Subject to any disclaimer, the term of this patent is extended or adjusted under 35 U.S.C. 154(b) by 344 days.

(21) Appl. No.: 16/949,171

(22) Filed: Oct. 16, 2020

(65) Prior Publication Data
US 2022/0121861 A1    Apr. 21, 2022

(51) Int. Cl.
*G06T 7/13* (2017.01)
*G06V 20/56* (2022.01)
(Continued)

(52) U.S. Cl.
CPC ............. *G06V 20/588* (2022.01); *G06N 7/01* (2023.01); *G06N 20/00* (2019.01); *G06T 7/13* (2017.01);
(Continued)

(58) Field of Classification Search
CPC ...... G06V 20/588; G06V 20/54; G06V 20/58; G06V 20/582; G06V 20/50; G06V 20/00; G06V 10/255; G06V 30/1473; G06V 20/182; G06V 10/22; G06V 10/26; G06V 10/457; G06V 10/762; G06V 10/765; G06V 10/225; G06V 10/23; G06V 10/764; G06V 10/44; G06V 10/757; G06V 10/82; G06V 10/454; G06K 9/00; G06K 9/6267; G06K 9/6271; G06T 7/13; G06T 2207/30236;
(Continued)

(56) References Cited

U.S. PATENT DOCUMENTS 11,527,077 B2 * 12/2022 Ko .......................... G06N 3/08
2019/0197693 A1 * 6/2019 Zagaynov ............... G06T 7/155
2019/0266418 A1 * 8/2019 Xu ........................ G05D 1/0221

OTHER PUBLICATIONS

Hwang et al., "Pose estimator and tracker using temporal flow maps for limbs," arXiv:1905.09500v1 [cs.CV] May 23, 2019, 8 Pages.

* cited by examiner

*Primary Examiner* — Sumati Lefkowitz
*Assistant Examiner* — Michael Adam Shariff

(57) ABSTRACT

In some implementations, a device may receive an image that depicts an environment associated with a vehicle. The device may partition the image into a plurality of subsections. The device may analyze the plurality of subsections to determine respective subsection information, wherein subsection information, for an individual subsection, indicates: a probability score that the subsection includes a line segment associated with an object class, a position of a representative point of the line segment, and a direction of the line segment. The device may identify, based on the respective subsection information of the plurality of subsections, a line associated with the object class that is associated with a set of subsections of the plurality of subsections. The device may perform one or more actions based on identifying the line associated with the object class.

20 Claims, 12 Drawing Sheets

(51) Int. Cl.
  *G06N 20/00* (2019.01)
  *G06T 11/20* (2006.01)
  *G06V 10/20* (2022.01)
  *G06N 7/01* (2023.01)

(52) U.S. Cl.
  CPC .......... *G06T 11/203* (2013.01); *G06V 10/255* (2022.01); *G06T 2207/20081* (2013.01); *G06T 2207/30256* (2013.01); *G06T 2210/12* (2013.01)

(58) Field of Classification Search
  CPC . G06T 2207/30252; G06T 2207/30256; G06T 2207/30261; G06T 7/10; G06T 7/11; G06T 7/12; G06T 7/136; G06T 7/246; G06T 11/203; G06T 11/20; G06T 2207/20081; G06T 2207/20084; G01C 21/3602; G01C 21/3815; G01C 21/3819; G01C 21/30; G01C 21/32; G01C 21/26; G01C 21/3626; G01C 21/28; G01C 21/1656; G01C 21/34; G06N 7/005; G06N 20/00; G06N 20/10; G06N 3/08; G06N 3/088; G05D 1/0221; B60W 30/09; B60W 30/08; B60W 30/00; B60W 30/095; B60W 30/0953; B60W 40/06; B60W 60/0011; B60W 60/00; B60W 60/001; B60W 30/10; B60W 30/12; B60W 40/04; B60W 60/00274
  See application file for complete search history.

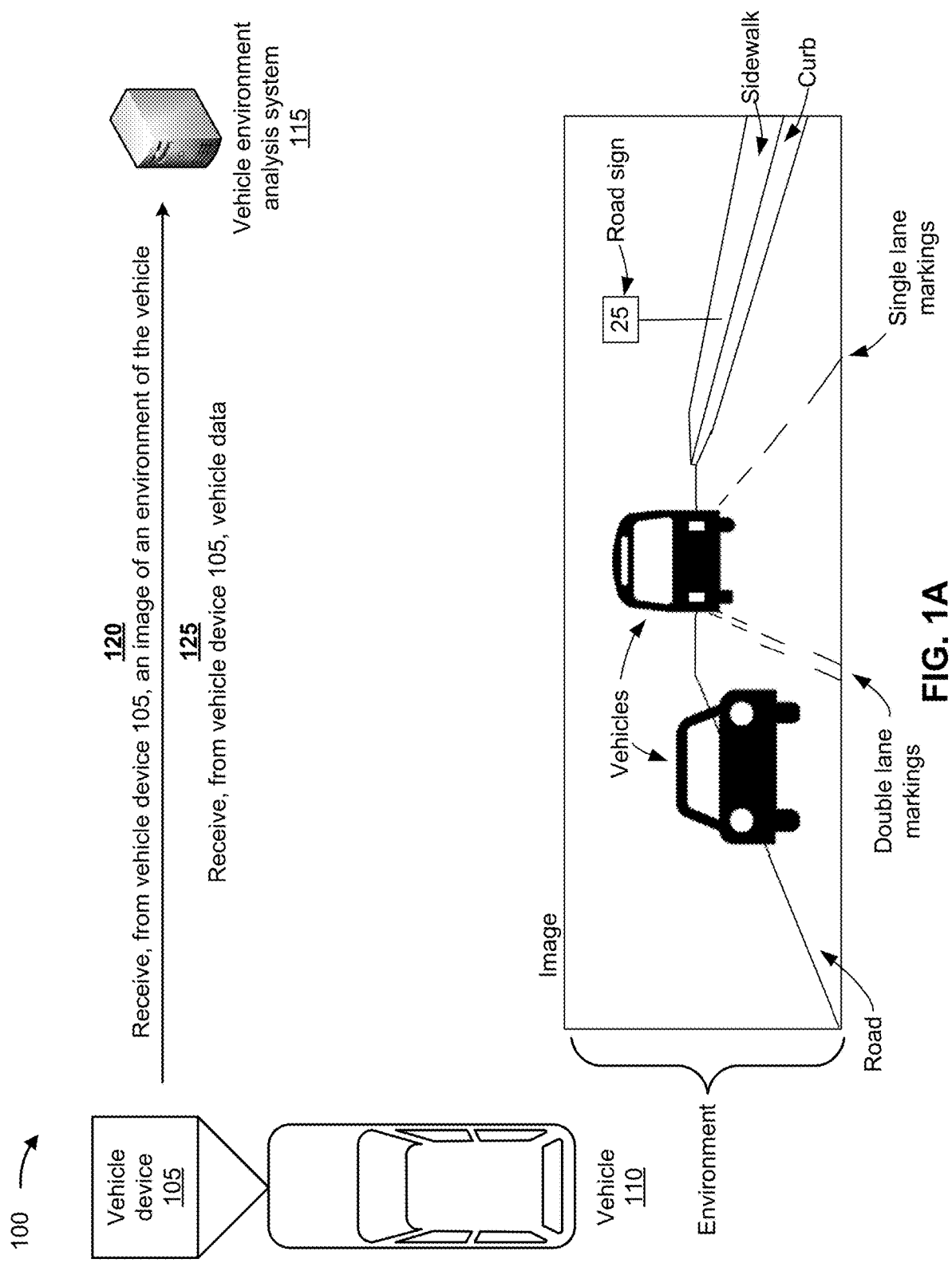

SYSTEMS AND METHODS FOR DETECTING OBJECTS IN AN IMAGE OF AN ENVIRONMENT

BACKGROUND

A dashboard camera can be mounted to a vehicle to capture video data related to the vehicle, a road the vehicle is traveling on, a path of the vehicle on the road, one or more objects on the road and/or in the path of the vehicle, and/or the like. Other sensor devices, such as a speedometer, an accelerometer, a location sensor, a steering angle sensor, and/or the like, may be attached to or incorporated into the vehicle to capture data.

BRIEF DESCRIPTION OF THE DRAWINGS

FIGS. 1A-1F are diagrams of an example associated with detecting objects in an image of an environment.

DETAILED DESCRIPTION OF PREFERRED EMBODIMENTS

Figure 1B:
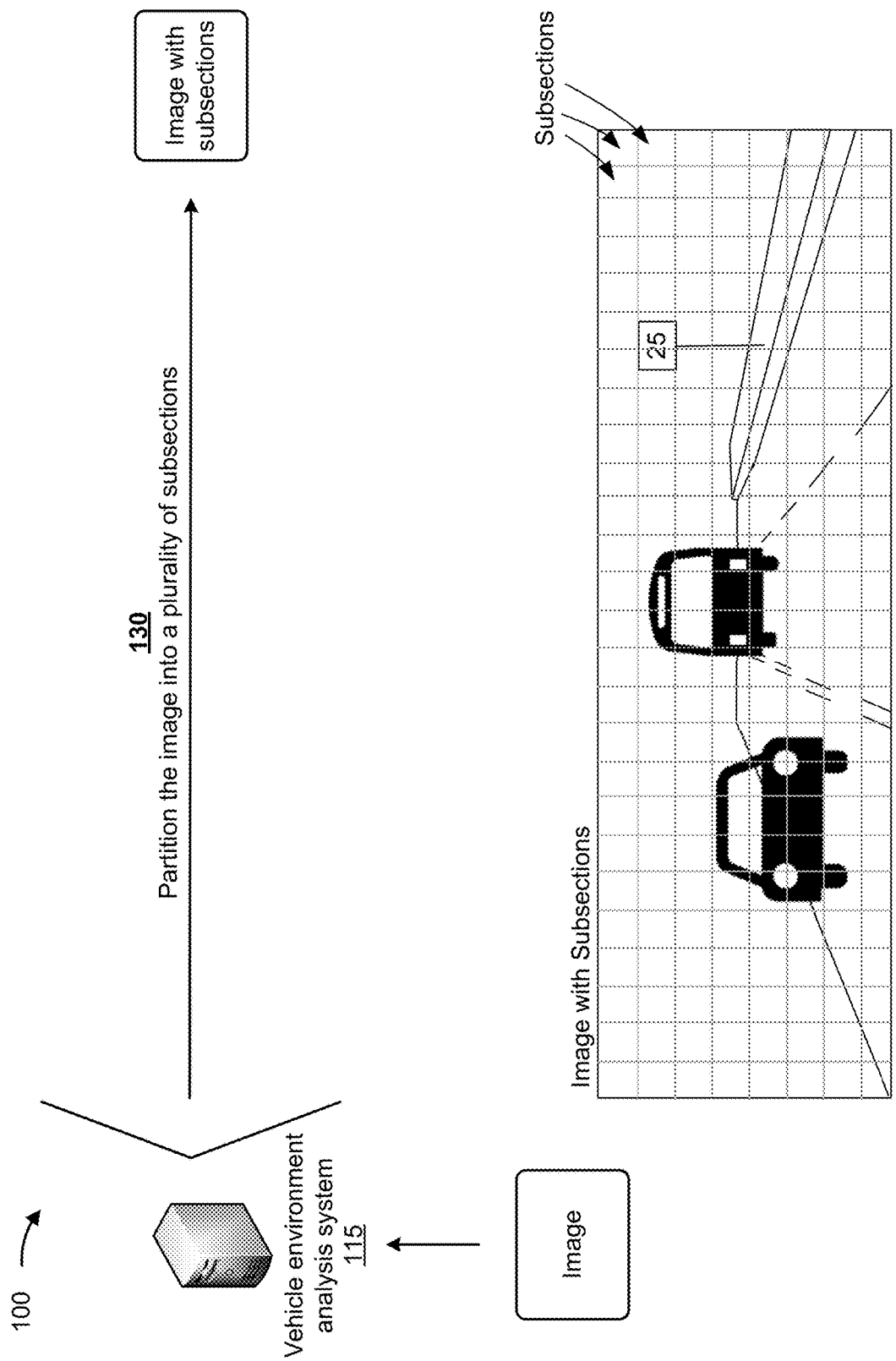

The following detailed description of example implementations refers to the accompanying drawings. The same reference numbers in different drawings may identify the same or similar elements.

A dashboard camera system can obtain video or image data regarding a driver's operation of a vehicle, which may provide valuable context to understanding a driver's driving behavior. In some cases, a dashboard camera system may comprise a forward facing camera (FFC) that captures an image of an environment of the vehicle (e.g., that includes a road that the vehicle is traveling on, one or more lane dividers associated with the road, one or more curbs associated with the road, one or more other vehicles on the road, one or more signs, and/or one or more other objects associated with the road, among other examples).

An environment monitoring system may use conventional object detection techniques to generate bounding boxes for identifying objects (e.g., vehicles, signs, and/or pedestrians, among other examples) in the image. However, such bounding boxes are aligned with x and y axes of the image, which may cause the bounding boxes to consume a larger area of the image to bound objects in the image that are not aligned to the x or y axes. This may cause the environment monitoring system to incorrectly determine a position and/or an area of an object. For example, the environment monitoring system may incorrectly determine that an object is in a path of the vehicle and thereby cause the vehicle to unnecessarily deploy an automatic collision avoidance maneuver. Furthermore, conventional object detection techniques are able to detect lane lines, road edges, and/or the like, only when they are not occluded in the image (e.g., by other vehicles or objects in the image) or may require several cameras facing in various directions to determine such information if at all. Accordingly, in some cases, the environment monitoring system may not be able to determine a lane line, a road edge, and/or the like, which may cause the environment monitoring system to incorrectly determine that the vehicle is or is not in a driving lane and thereby cause the vehicle to unnecessarily deploy an automatic path correction maneuver.

Some implementations described herein provide a vehicle environment analysis system that processes one or more images of an environment of a vehicle from a single camera, in one embodiment. For example, the vehicle environment analysis system partitions the image into subsections (e.g., comprising multiple pixels) and analyzes (e.g., using a machine learning model) each subsection to determine a probability score that the subsection includes a line segment associated with an object class (e.g., a class associated with lane lines and/or a class associated with road objects, among other examples), a position of a representative point of the line segment in the subsection, and a direction of the line segment in the subsection. Based on this information, the vehicle environment analysis system identifies one or more lines associated with the object class (e.g., one or more lines associated with lane lines and/or one or more lines associated with road objects, among other examples). In some implementations, the vehicle environment analysis system identifies bounding polygons for an object associated with the object class (e.g., for road objects).

In this way, the vehicle environment analysis system processes an image of an environment of a vehicle to provide tight bounding polygons, as opposed to simple boxes, around objects in the environment and to demarcate lane lines, road edges, and/or the like, of a road even when the lane lines, road edges, and/or the like are occluded by objects in the image. Accordingly, the vehicle environment analysis system more precisely identifies a location of the vehicle on the road and/or positions of objects in the environment, which prevents unnecessary use of collision avoidance or path correction maneuvers and allows the analysis system to provide more accurate alerts of lane drifting, changing or the like. This results in increased safety of a driver of the vehicle, the vehicle, and other people and property. This also results in less wear-and-tear on the vehicle or vehicle components, which reduces costs associated with maintaining the vehicle. Furthermore, because the vehicle environment analysis system analyzes subsections of the image that respectively comprise multiple pixels, the vehicle environment analysis system consumes less computing resources (e.g., processing resources, memory resources, and/or power resources, among other examples) to analyze an image than is consumed using a conventional object detection technique that employs a pixel-by-pixel analysis. Moreover, a size of the subsections may be adjusted to allow a balance between usage of computing resources and precision (e.g., smaller subsections for greater precision but greater usage of computing resources or bigger subsections for less precision but lesser usage of computing resources). In some implementations, when the subsections are of a sufficiently large size, the vehicle environment analysis system processes an image in real-time (e.g., as the vehicle environment analysis system obtains the image, within a threshold amount of time).

FIGS. 1A-1F are diagrams of an example 100 associated with detecting objects in an image of an environment. As shown in FIGS. 1A-1F, example 100 includes a vehicle device 105 associated with a vehicle 110 and a vehicle environment analysis system 115. In some implementations, the vehicle device 105 may include devices (e.g., on-board diagnostic (OBD) devices, electronic control units (ECUs), and/or the like) that obtain vehicle information (e.g., engine on condition, engine off condition, data indicating acceleration, speed, movement, and/or the like) of the vehicle 110 and control other vehicle devices. In some implementations, the vehicle device 105 may include a camera, such as an FFC, that captures an image of an environment of the vehicle (e.g., that includes a road that the vehicle is traveling on, one or more lane dividers associated with the road, one or more curbs associated with the road, one or more other vehicles on the road, one or more signs, and/or one or more other objects associated with the road, among other examples). In some implementations, the vehicle device 105 may include a vehicle tracking unit (VTU) that periodically transmits (e.g., via a cellular network) messages, each typically including information that identifies a current location of the vehicle 110. The VTU can also be capable of transmitting other information associated with the VTU and/or the vehicle 110, such as the vehicle information, image data (e.g., that includes the image), and/or the like. Vehicle environment analysis system 115 may include a system that utilizes one or more computer vision techniques and/or a machine learning model to identify one or more objects in the environment of the vehicle based on the image. In some implementations, vehicle environment analysis system may be included in the vehicle 110 or remote to the vehicle 110.

As shown in FIG. 1A, and by reference number 120, the vehicle environment analysis system 115 may receive the image from the vehicle device 105. For example, the vehicle device 105 (e.g., using the VTU) may send the image to the vehicle environment analysis system 115 (e.g. via the cellular network). The image may be captured by the camera of the vehicle device 105 and may depict the environment of the vehicle.

As further shown in FIG. 1A, and by reference number 125, the vehicle environment analysis system 115 may receive vehicle data from the vehicle device 105. For example, the vehicle device 105 (e.g., using the VTU) may send the vehicle data to the vehicle environment analysis system 115 (e.g. via the cellular network). The vehicle device 105 may send the vehicle data in coordination with sending the image to the vehicle environment analysis system 115 (e.g., within a particular amount of time of sending the image). The vehicle data may include identifying characteristics of the vehicle 110 (e.g., speed, acceleration, location, orientation, braking, and/or the like) during capture of the image.

Turning to FIG. 1B and reference number 130, the vehicle environment analysis system 115 may partition the image into a plurality of subsections. In some implementations, the vehicle environment analysis system 115 may partition the image into a plurality of equal-sized subsections. For example, each subsection may be square and respectively comprise N×N pixels (e.g., where N≥2), may be rectangular and respectively comprise M×L pixels (e.g., where M≥2 and L≥2), and/or the like.

Figure 1C:
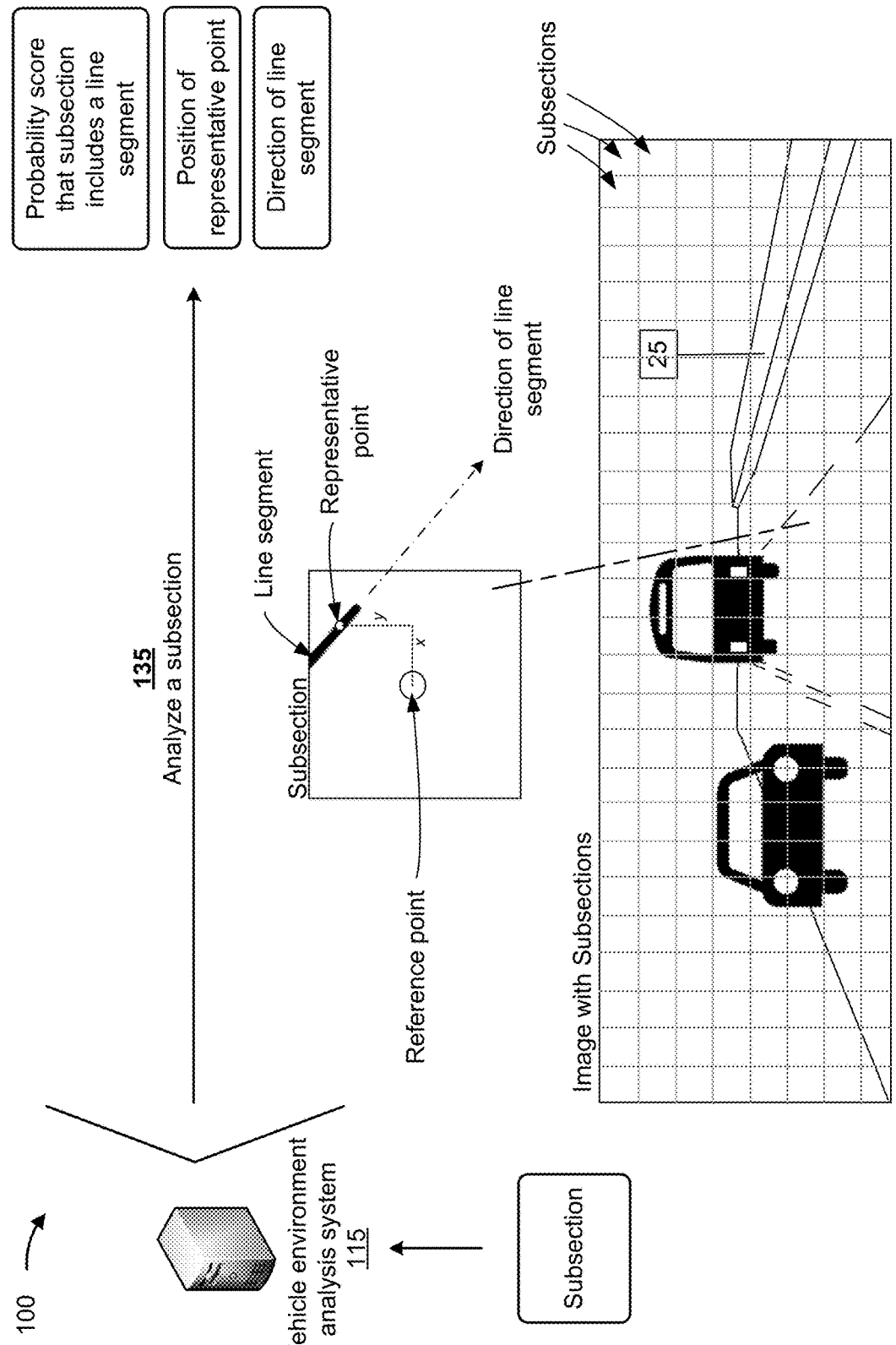

Turning to FIG. 1C and reference number 135, the vehicle environment analysis system 115 may analyze one or more subsections of the plurality of subsections. In some implementations, the vehicle environment analysis system 115 may analyze a subsection to determine whether the subsection includes a line segment that is associated with an object class. The object class may be, for example, a roadway identification class that includes lane markings, road edges, road curbs, and/or highway shoulders, among other examples, that may be part of the environment of the vehicle. As another example, the object class may be a roadway information class that includes other vehicles, road signs, street signs, exit signs, and/or traffic lights, among other examples, that may be part of the environment of the vehicle.

In some implementations, the vehicle environment analysis system 115 may determine a probability score that the subsection includes a line segment that is associated with the object class. For example, the vehicle environment analysis system 115 may process the subsection (e.g., using one or more computer vision techniques and/or a machine learning model, described herein) to determine a probability score (e.g., a 0% probability score, a 20% probability score, a 55% probability score, a 99% probability score, a 100% probability score, and/or the like) that the subsection includes a line segment associated with the particular object class.

In some implementations, the vehicle environment analysis system 115 may determine and/or identify a representative point of the line segment of the subsection. For example, the vehicle environment analysis system 115 may determine and/or identify (e.g., using the one or more computer vision techniques and/or the machine learning model described herein) a representative point of the line segment of the subsection that is closest to a reference point of the subsection, such as a center point, a corner point, or another point of the subsection. The vehicle environment analysis system 115 may determine a position of the representative point of the line segment in relation to the reference point of the subsection. For example, the vehicle environment analysis system 115 may determine an x-coordinate and a y-coordinate of the representative point of the line segment in relation to the particular point of the subsection (e.g., where the particular point acts as an origin point for the subsection).

In some implementations, the vehicle environment analysis system 115 may determine a direction associated with the line segment of the subsection. For example, the vehicle environment analysis system 115 may determine and/or identify (e.g., using the one or more computer vision techniques and/or the machine learning model described herein) an additional point of the line segment of the subsection and determine a position of the additional point (e.g., in relation to the reference point of the subsection). The vehicle environment analysis system 115 may determine the direction associated with the line segment (e.g., a slope of the line segment) based on a difference between the position of the representative point of the line segment and the position of the additional point of the line segment. For example, the vehicle environment analysis system 115 may determine the direction associated with the line segment based on a difference between the respective x-coordinates of the representative point of the line segment and the additional point of the line segment and a difference between the respective y-coordinates of the representative point of the line segment and the additional point of the line segment.

In some implementations, such as when the probability score that the subsection includes a line segment associated with the object class fails to satisfy a threshold (e.g., the probability score is less than the threshold), the vehicle environment analysis system 115 may determine that a line segment of the subsection does not exist, and accordingly may determine that a representative point of the line segment does not exist and a direction of the line segment does not exist. Accordingly, the vehicle environment analysis system 115 may respectively assign the representative point of the line segment and the direction of the line segment to have a value of "0," "null", or any other indicator to represent a nonexistent value.

In some implementations, the vehicle environment analysis system 115 may analyze the subsection using one or more computer vision techniques to determine the probability score that the subsection includes a line segment associated with the object class, to determine and/or identify the representative point of the line segment of the subsection, to determine the position of the representative point of the line segment in the subsection, and/or to determine the direction associated with the line segment of the subsection. The one or more computer vision techniques may include, for example, an image recognition technique (e.g., an Inception framework, a ResNet framework, a Visual Geometry Group (VGG) framework, and/or the like) and/or an object detection technique (e.g. a Single Shot Detector (SSD) framework, a You Only Look Once (YOLO) framework, and/or the like).

In some implementations, the vehicle environment analysis system 115 may analyze the subsection using a machine learning model to determine the probability score that the subsection includes a line segment associated with the object class, to determine and/or identify the representative point of the line segment of the subsection, to determine the position of the representative point of the line segment in the subsection, and/or to determine the direction associated with the line segment of the subsection. The machine learning model may include, for example, a neural network, a convolutional neural network, a statistical neural network, an edge detection model (e.g., a Sobel model, a Canny model, and/or a Laplacian of Gaussian model, among other examples), a voting model (e.g., a Hough transform model and/or a shortest path model, among other examples), and/or an evolutionary model (e.g., a genetic algorithm model and/or an ant colony system optimization model, among other examples). The machine learning model may have been trained based on training data that includes, for example, subsection data (e.g., images of respective environments obtained from multiple vehicle devices 105 associated with multiple vehicles 110, wherein the images are partitioned into subsections), identifications of line segments associated with the object class in subsections of the subsection data, identifications of representative points of the line segments in subsections of the subsection data, and/or identifications of directions of the line segments in subsections of the subsection data. Using the training data as input to the machine learning model, the machine learning model may be trained to identify one or more relationships (e.g., between the subsection data and the identifications of the line segments associated with the object class, the identifications of representative points of the line segments, and/or the identifications of the directions of the line segments, among other examples) to determine a probability score that a subsection includes a line segment associated with an object class, to determine and/or identify a representative point of the line segment of the subsection, to determine a position of the representative point of the line segment in the subsection, and/or to determine a direction associated with the line segment of the subsection. The machine learning model may be trained and/or used in a similar manner to that described below with respect to FIG. 2.

Figure 1D:
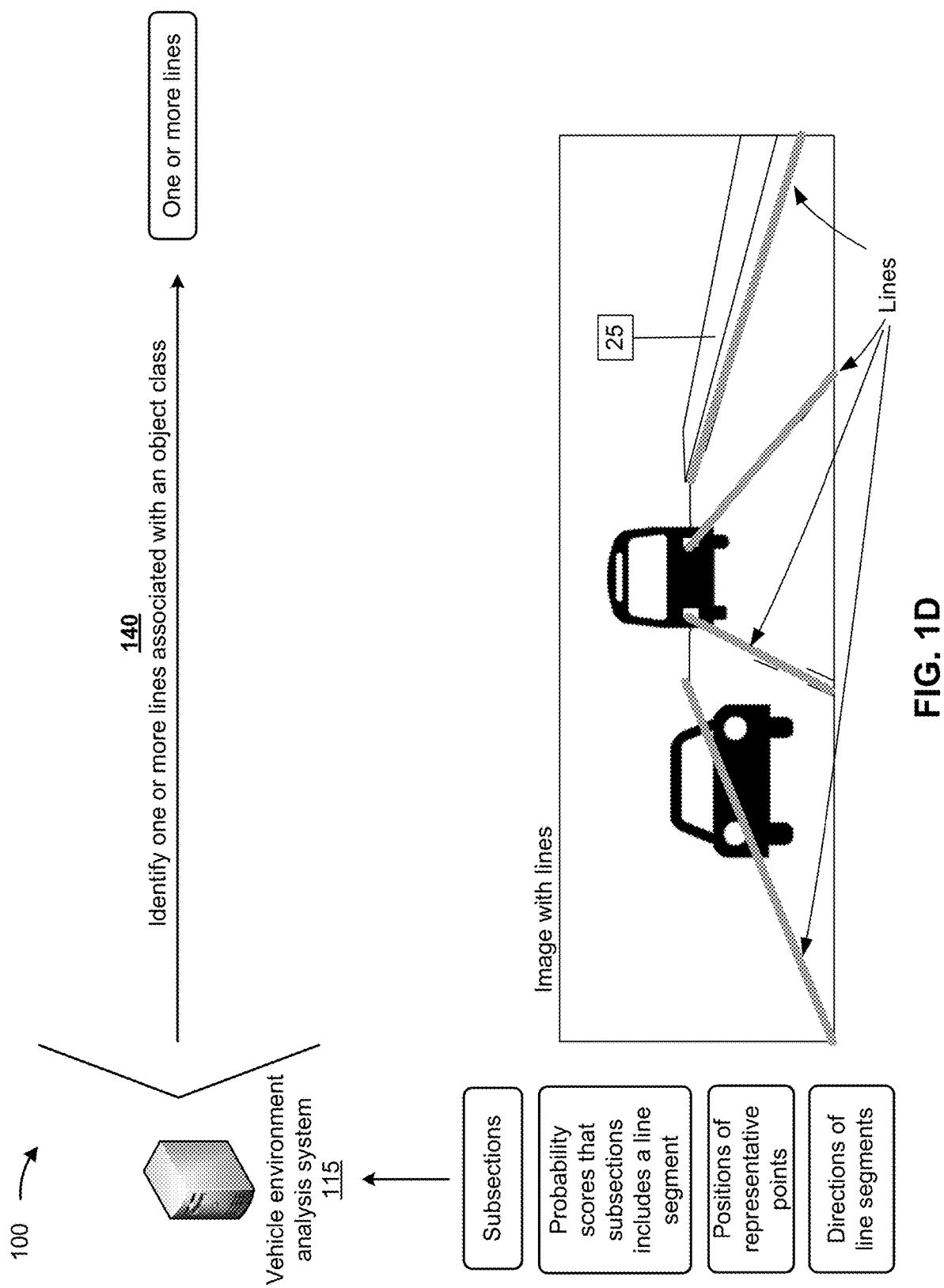

Turning to FIG. 1D and reference number 140, the vehicle environment analysis system 115 may identify one or more lines associated with the object class in the image. A line may be associated with one or more line segments that are respectively associated with one or more subsections of the plurality of subsections of the image. In some implementations, to identify a line associated with the object class, the vehicle environment analysis system 115 may select a particular subsection, of the plurality of subsections. For example, the vehicle environment analysis system 115 may select a subsection associated with a top-most, left-most subsection of the image.

When the probability score that the subsection includes a line segment associated with the object class satisfies (e.g., is greater than or equal to) a threshold, the vehicle environment analysis system 115 may select another subsection, such as an adjacent subsection (e.g., a subsection that includes a border that touches a border of the particular subsection). The vehicle environment analysis system 115 may identify the representative point associated with the particular subsection (hereinafter referred to as "point A") and the representative point associated with the adjacent subsection (hereinafter referred to as "point B") and may determine a direction from point A to point B (herein referred to as the "AB direction"). In some implementations, the vehicle environment analysis system 115 may determine the AB direction based on a position of point A in the particular subsection and a position of point B in the adjacent subsection. For example, the vehicle environment analysis system 115 may determine the AB direction based on a difference between the respective x-coordinates of point A and point B, and a difference between the respective y-coordinates of point A and point B (e.g., in relation to a reference point of the particular subsection, such as a center point, a corner point, or another point of the particular subsection).

The vehicle environment analysis system 115 may compare the AB direction and the direction associated with the line segment of the particular subsection (e.g., that was determined by vehicle environment analysis system 115, as described above in regard to FIG. 1C and reference number 135) to determine whether the AB direction and the direction associated with the line segment of the particular subsection match (e.g., are equal to each other, within a threshold). For example, the vehicle environment analysis system 115 may use a formula of the following form to determine whether the AB direction and the direction associated with the line segment of the particular subsection match: arccos $$\left( \frac{\vec{v}}{\|\vec{v}\|} \cdot \frac{\overrightarrow{AB}}{\|\overrightarrow{AB}\|} \right) \leq threshold,$$

where $\vec{v}$ is the direction associated with the line segment of the particular subsection and $\overrightarrow{AB}$ is the AB direction. The threshold may be represented in radians (e.g., 0.2 radians, 0.5 radians, and/or 1 radian, among other examples) or degrees (e.g., 5 degrees, 10 degrees, 11.4 degrees, and/or 12.75 degrees, among other examples).

When the vehicle environment analysis system 115 determines that the AB direction and the direction associated with the line segment of the particular subsection do not match, the vehicle environment analysis system 115 may determine that the line segment associated with the particular subsection is not associated with a line associated with the object class. Alternatively, when the vehicle environment analysis system 115 determines that the AB direction and the direction associated with the line segment of the particular subsection match, the vehicle environment analysis system 115 may determine that the line segment associated with the particular subsection is associated with a line associated with the object class. The vehicle environment analysis system 115 may then iteratively select and analyze one or more other subsections of the plurality of subsections in a similar manner to determine and/or identify other line segments associated with the line. In some implementations, the vehicle environment analysis system 115 may use a clustering technique, such as an affinity graph technique and/or a connected components analysis technique, among other examples, to identify line sections associated with the line. Accordingly, in this way, the vehicle environment analysis system 115 may determine and/or identify a set of subsections that are associated with the same line.

The vehicle environment analysis system 115 may process (e.g., using a best fit technique, such as using an ordinary least squares (OLS) technique, a random sample consensus (RANSAC) technique, a Huber regression technique, and/or an L1-penalty regression technique, among other examples) the respective representative points of the subsections that comprise the set of subsections to determine and/or identify the line. In this way, when the line is associated with a roadway identification class, for example, the vehicle environment analysis system 115 may determine and/or identify lines (e.g., as shown in FIG. 1D) that are associated with lane markings, road edges, road curbs, and/or highway shoulders, among other examples that are part of the environment of the vehicle (e.g., even when the lane markings, road edges, road curbs, highway shoulders, and/or the like are occluded in the image).

Figure 1E:
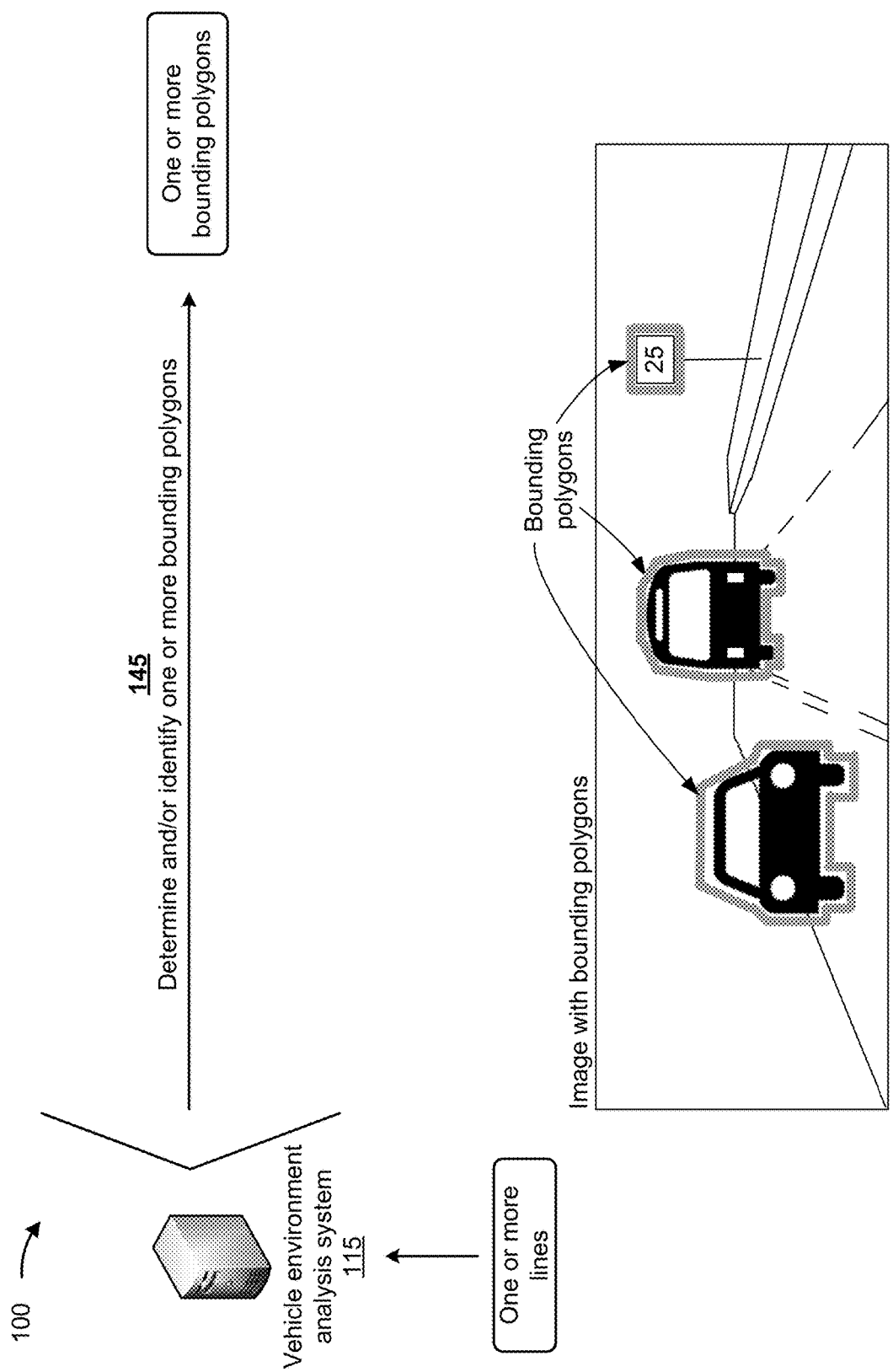

In some implementations, as shown in FIG. 1E, and by reference number 145, such as when the line is associated with a roadway information class, the vehicle environment analysis system 115 may determine whether the line and one or more other lines (e.g., of the same object class) form a closed polygon. For example, the vehicle environment analysis system 115 may determine, for each of the line and the one or more other lines, that a "starting" point of the line coincides (e.g., within a threshold distance) with an "ending" point of a first different line, and that an "ending point" of the line coincides (e.g., within the threshold distance) with a "starting" point of a second different line. In some implementations, the vehicle environment analysis system 115 may use a clustering technique, such as an affinity graph technique and/or a connected components analysis technique, among other examples, to identify representative points of the subsections associated with the line and the one or more other lines. The vehicle environment analysis system 115 may process (e.g., using a best fit technique, an OLS technique, a RANSAC technique, a Huber regression technique, and/or an L1-penalty regression technique, among other examples) the respective representative points of the subsections associated with the line and the one or more other lines to determine and/or identify a bounding polygon. In this way, the vehicle environment analysis system 115 may determine and/or identify one or more bounding polygons for other vehicles, road signs, street signs, exit signs, and/or traffic lights, among other examples, that are part of the environment of the vehicle.

Figure 1F:
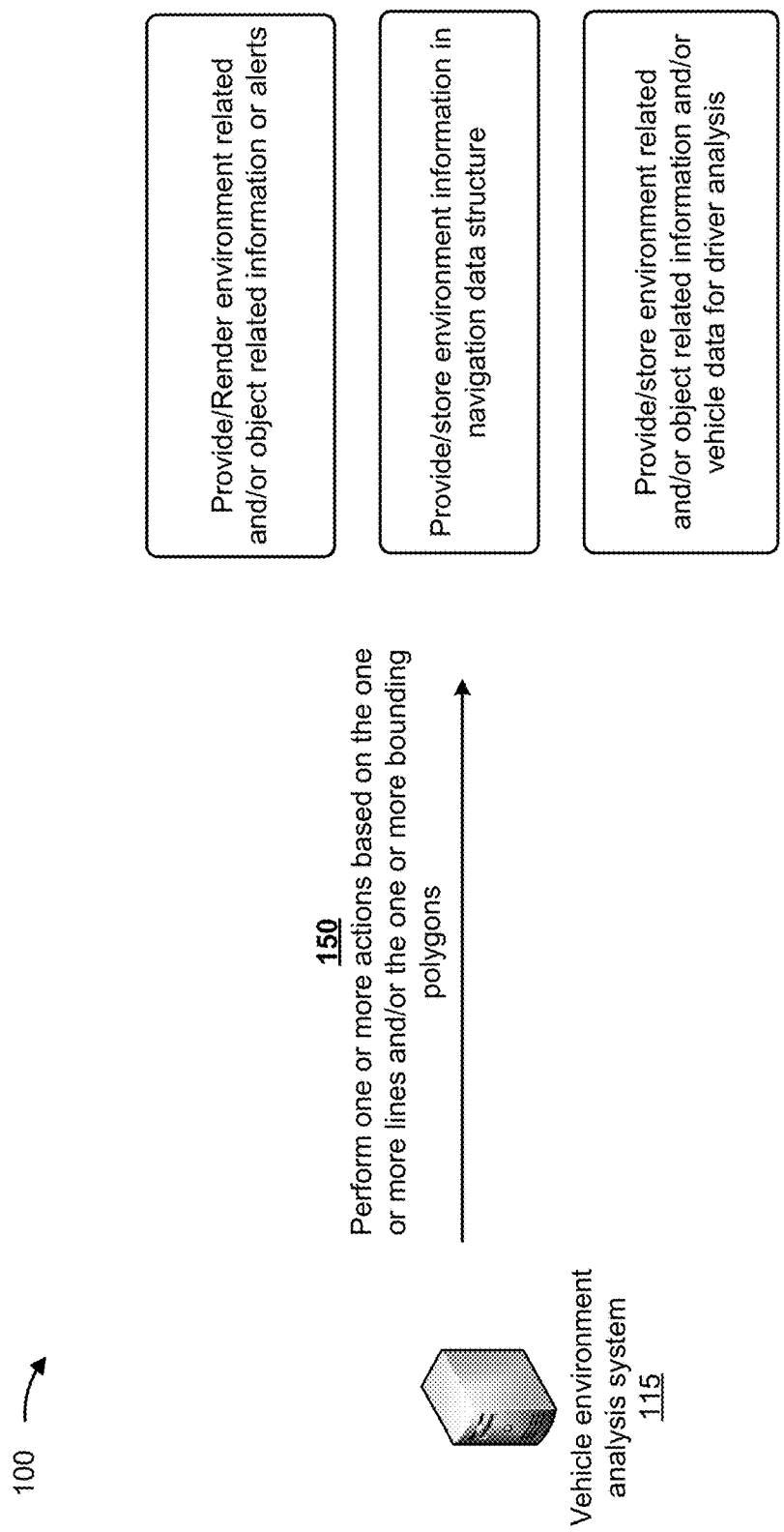

Turning to FIG. 1F and reference number 150, the vehicle environment analysis system 115 may perform one or more actions based on the one or more lines and/or the one or more bounding polygons determined by the vehicle environment analysis system 115. In some implementations, the one or more actions may include providing and/or rendering environment related and/or object related information or alerts. For example, the vehicle environment analysis system 115 may provide the image, the one or more lines, and/or the one or more bounding polygons for display (e.g., render the one or more lines and/or the one or more bounding polygons over the image) on a client device or on another device associated with the vehicle 110 for display to the driver of vehicle 110 and/or to a manager of the vehicle 110, among other examples. As another example, the vehicle environment analysis system 115 may provide information and/or alerts (e.g., about a position of the vehicle in a lane, about an object in a path of the vehicle, and/or the like) to the vehicle 110 (e.g., to be displayed on a display of the vehicle 110) for display to the driver. In this way, the vehicle environment analysis system 115 may enable the driver of vehicle 110, the manager of the vehicle, and/or the like, to be aware of the environment of the vehicle and/or objects within the environment of the vehicle. This may enable the driver to effectively adjust and/or improve driving techniques and/or behavior, which may improve road safety, prevent wear and tear on the vehicle, and/or conserve resources that would otherwise be wasted handling vehicle accidents, maintaining the vehicle, and/or the like.

In some implementations, the one or more actions may include providing the environment related and/or object related information to a navigation data structure associated with a navigation system. Accordingly, the navigation system may obtain the environment related and/or object related information from the navigation data structure and determine a width of a particular road (e.g., by measuring a distance between lane markings, a width of a vehicle in relation to a width of a road, and/or the like), whether the particular road is experiencing traffic, and/or whether the particular road is blocked and/or has restrictions because of an object in the road, among other examples. In this way, the navigation system, based on the environment related and/or object related information, may optimize a route for the vehicle (e.g., propose a route that takes a different road), as well as other vehicles (e.g., large vehicles, such as trucks, that may not be able to travel on narrow roads), and thereby conserve fuel resources of the vehicles, prevent damage to the vehicles, and/or prevent unnecessary wear and tear on the vehicles, among other examples.

In some implementations, the one or more actions may include providing the environment related and/or object related information and the vehicle data (e.g., that was obtained by the vehicle environment analysis system 115 from the vehicle device 105, as described herein in relation to FIG. 1A and reference number 125) to a vehicle management data structure associated with a vehicle management system. Accordingly, the vehicle management system may obtain the environment related and/or object related information and the vehicle data from the vehicle management data structure and determine a driving behavior of the driver of the vehicle. The vehicle management system may identify dangerous and/or distracted driving behavior and provide information regarding the dangerous and/or distracted driving behavior to the vehicle 110 (e.g., to be displayed on a display of the vehicle 110) for display to the driver. This may enable the driver to effectively adjust and/or improve driving techniques and/or behavior, which may improve road safety, conserve fuel, conserve resources that would otherwise be wasted policing poor driving behavior and/or handling vehicle accidents, and/or the like.

While some implementations are described herein in relation to processing an image of a vehicle environment, additional implementations are directed to processing an image of any type of environment (e.g., any image of an environment that depicts objects comprising lines).

As indicated above, FIGS. 1A-1F are provided as an example. Other examples may differ from what is described with regard to FIGS. 1A-1F. The number and arrangement of devices shown in FIGS. 1A-1F are provided as an example.

In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
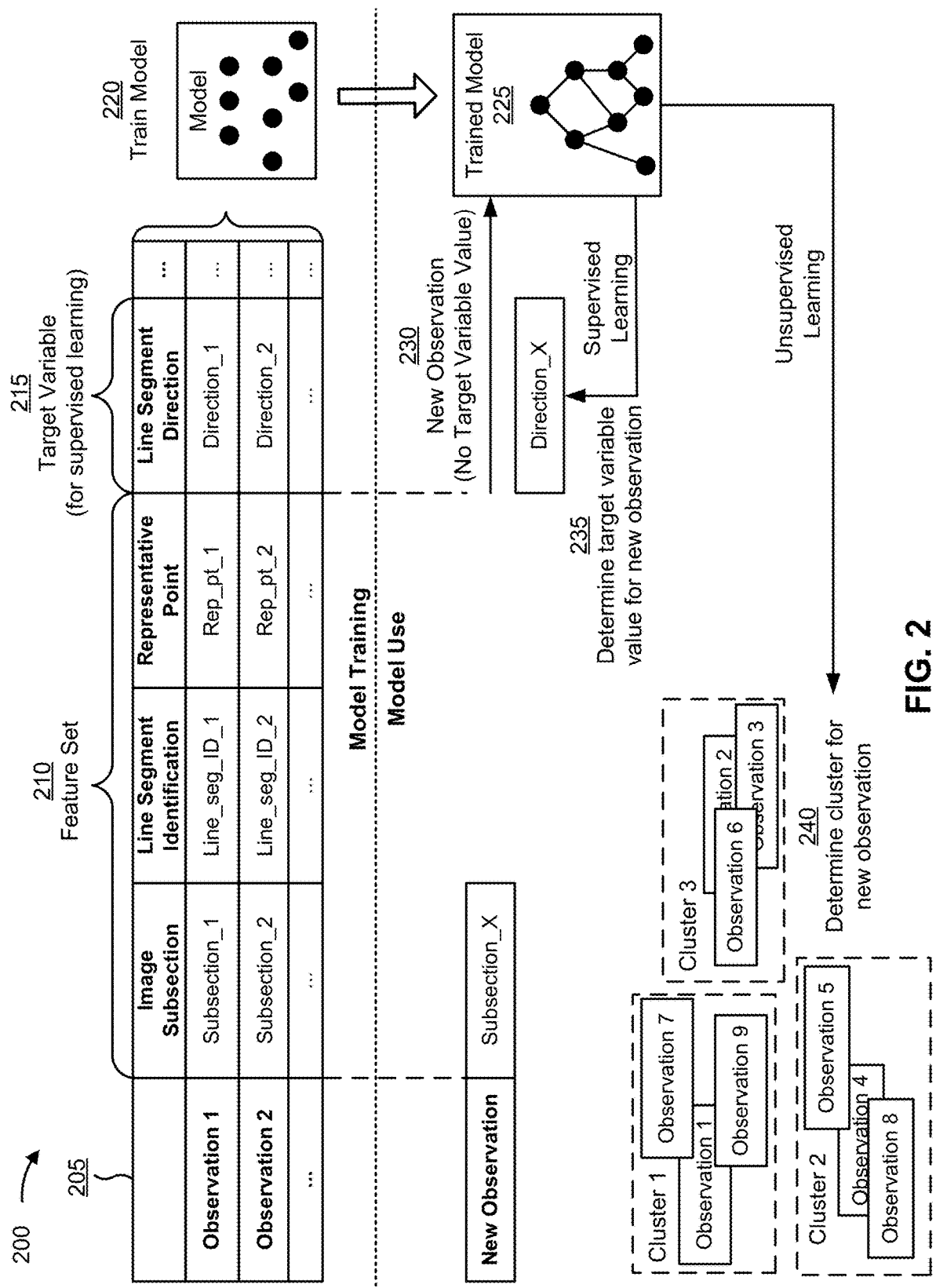
FIG. 2 is a diagram illustrating an example of training and using a machine learning model in connection with detecting objects in an image of an environment.

FIG. 2 is a diagram illustrating an example 200 of training and using a machine learning model in connection with detecting objects in an image of an environment. The machine learning model training and usage described herein may be performed using a machine learning system. The machine learning system may include or may be included in a computing device, a server, a cloud computing environment, and/or the like, such as the vehicle environment analysis system 115 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from vehicle device 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from vehicle device 105. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a subsection of an image, a second feature of an identification of a line segment in the subsection, a third feature of an identification of a representative point of the line segment in the subsection, and so on. As shown, for a first observation, the first feature may have a value of Subsection_1, the second feature may have a value of Line_seg_ID_1, the third feature may have a value of Rep_pt_1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is line segment direction, which has a value of Direction_1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include just a feature value of Subsection_X, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of Direction_X for the target variable of line segment direction for the new observation, as shown by reference number 235. In some implementations, the trained machine learning model 225 may classify (e.g., cluster) the new observation in a cluster, as shown by reference number 240. The observations within a cluster may have a threshold degree of similarity. As an example, the machine learning system may classify the new observation in a particular cluster (e.g., line segments associated with a particular direction range).

In this way, the machine learning system may apply a rigorous and automated process to determining a direction of a line segment in a subsection of an image. The machine learning system enables recognition and/or identification of tens, hundreds, thousands, or millions of features and/or feature values for tens, hundreds, thousands, or millions of observations, thereby increasing accuracy and consistency and reducing delay associated with determining a direction of a line segment in a subsection of an image relative to requiring computing resources to be allocated for tens, hundreds, or thousands of operators to manually determine a direction of a line segment in a subsection of an image using the features or feature values. While some implementations described herein in relation to FIG. 2 are directed to determining a direction of a line segment in a subsection of an image, the description provided herein in relation to FIG. 2 applies to training and applying a machine learning model to determine a probability score that a subsection includes a line segment associated with an object class, to determine and/or identify a representative point of the line segment of the subsection, to determine a position of the representative point of the line segment in the subsection, and/or the like (e.g., as described herein in relation to FIG. 1D.

As indicated above, FIG. 2 is provided as an example. Other examples may differ from what is described in connection with FIG. 2.

Figure 3:
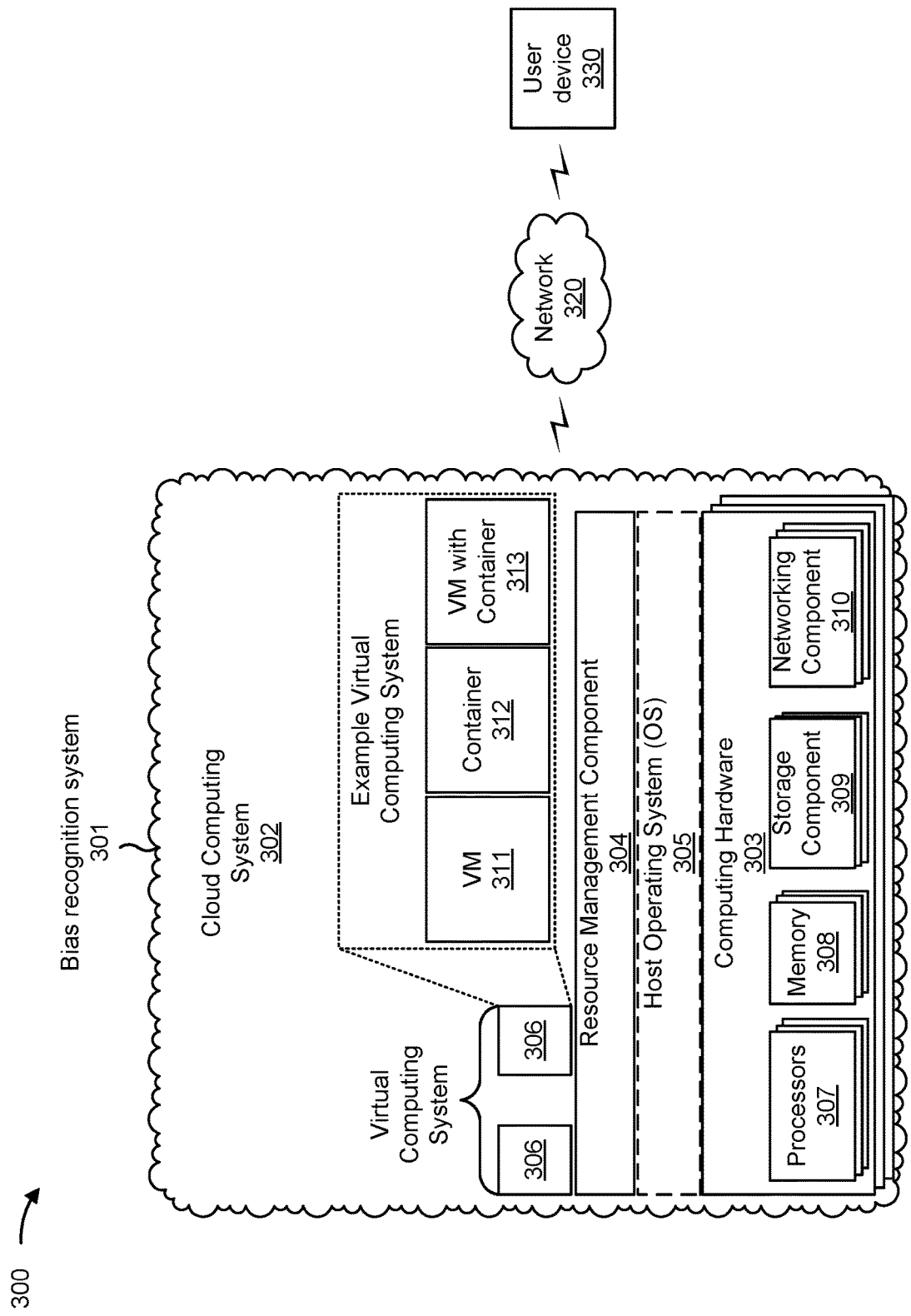
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a vehicle environment analysis system 115, which may include one or more elements of and/or may execute within a cloud computing system 302. The cloud computing system 302 may include one or more elements 303-313, as described in more detail below. As further shown in FIG. 3, environment 300 may include a network 320, and/or a vehicle device 105. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the vehicle environment analysis system 115 may include one or more elements 303-313 of the cloud computing system 302, may execute within the cloud computing system 302, and/or may be hosted within the cloud computing system 302, in some implementations, the vehicle environment analysis system 115 may not be cloud-based (e.g., may be implemented outside of a cloud computing system) or may be partially cloud-based. For example, the vehicle environment analysis system 115 may include one or more devices that are not part of the cloud computing system 302, such as device 400 of FIG. 4, which may include a standalone server or another type of computing device. The vehicle environment analysis system 115 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Vehicle device 105 includes one or more devices capable of receiving, generating, storing, processing, and/or providing information, such as information described herein. For example, vehicle device 105 may include a mobile phone (e.g., a smart phone, a radiotelephone, etc.), a laptop computer, a tablet computer, a handheld computer, a device included in vehicle 110 (e.g., an inertial measurement unit, a three-axis accelerometer, a global positioning system (GPS) device, an OBD device, an ECU, a camera (e.g., a FFC), and/or the like) or a similar type of device. In some implementations, vehicle device 105 may receive information from and/or transmit information to vehicle environment analysis system 115.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
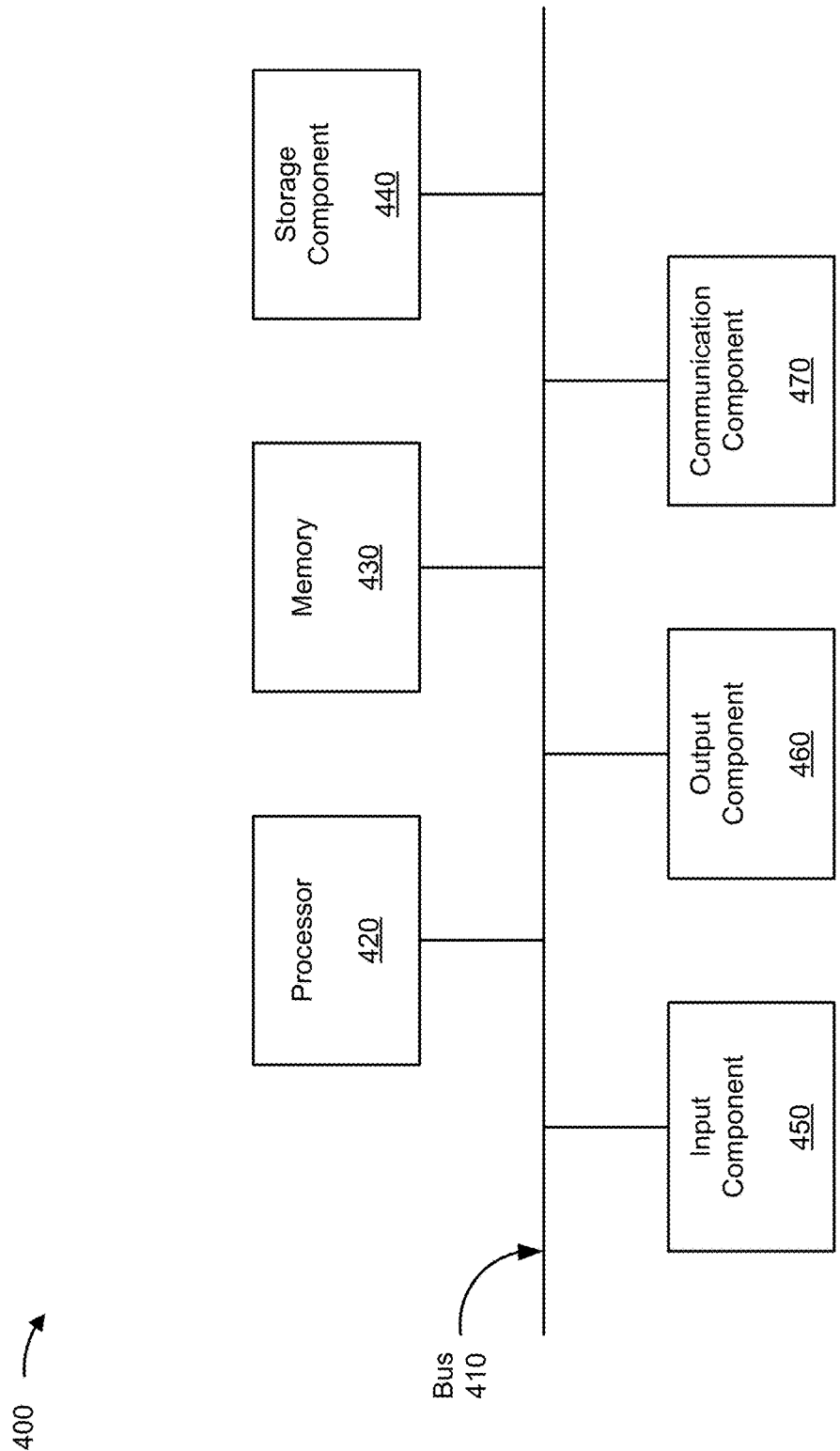
FIG. 4 is a diagram of example components of one or more devices of FIG. 3.

FIG. 4 is a diagram of example components of a device 400, which may correspond to vehicle device 105, vehicle environment analysis system 115, and/or computing hardware 303. In some implementations, vehicle device 105, vehicle environment analysis system 115, and/or computing hardware 303 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
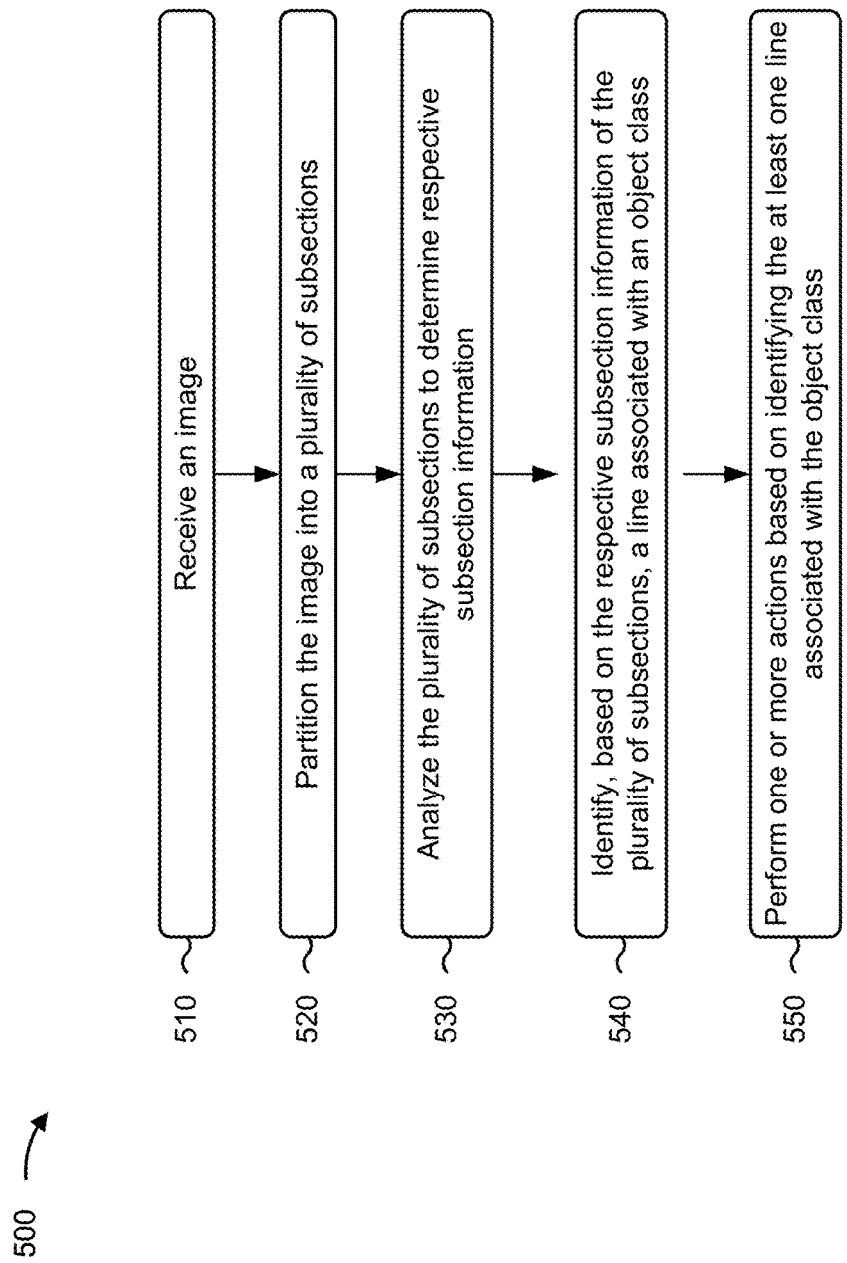
FIGS. 5-7 are flowcharts of example processes relating to detecting objects in an image of an environment.

FIG. 5 is a flowchart of an example process 500 associated with systems and methods for detecting objects in an image of an environment. In some implementations, one or more process blocks of FIG. 5 may be performed by a device (e.g., vehicle environment analysis system 115). In some implementations, one or more process blocks of FIG. 5 may be performed by another device or a group of devices separate from or including the device, such as the vehicle device 105. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving an image (block 510). For example, the device may receive an image that depicts an environment, such as an environment associated with a vehicle, as described above.

As further shown in FIG. 5, process 500 may include partitioning the image into a plurality of subsections (block 520). For example, the device may partition the image into a plurality of subsections, as described above. In some implementations, each subsection, of the plurality of subsections, comprises an equal number of pixels.

As further shown in FIG. 5, process 500 may include analyzing the plurality of subsections to determine respective subsection information (block 530). For example, the device may analyze the plurality of subsections to determine respective subsection information, wherein subsection information, for an individual subsection, indicates: a probability score that the subsection includes a line segment associated with an object class, a position of a representative point of the line segment, and a direction of the line segment, as described above. In some implementations, the object class is associated with at least one of the following objects: a lane marking, a road edge, a road curb, a highway shoulder another vehicle, a road sign, a street sign, an exit sign, or a traffic light.

In some implementations, analyzing the plurality of subsections includes using a machine learning model to process a subsection, of the plurality of subsections, to determine for the subsection at least one of: a probability score that the subsection includes a line segment associated with the object class, a position of a representative point of the line segment, or a direction of the line segment. The machine learning model may be trained based on images that depict various vehicle environments.

In some implementations, analyzing the plurality of subsections includes processing a subsection, of the plurality of subsections, using the machine learning model to determine a probability score that the subsection includes a line segment associated with the object class; identifying, based on the probability score satisfying a threshold, a representative point of the line segment in the subsection; determining a position of the representative point of the line segment in relation to a reference point of the subsection; and determining a direction associated with the line segment. In some implementations, determining the direction associated with the line segment includes determining a position of an additional point of the line segment within the subsection, and determining the direction associated with the line segment based on a difference between the position of the representative point and the position of the additional point.

As further shown in FIG. 5, process 500 may include identifying, based on the respective subsection information of the plurality of subsections, a line associated with an object class (block 540). For example, the device may identify, based on the respective subsection information of the plurality of subsections, a line associated with an object class that is associated with a set of subsections of the plurality of subsections, as described above. In some implementations, the line associated with the object class is a best fit line associated with representative points of respective line segments associated with the object class that are included in the set of subsections.

In some implementations, identifying the line associated with the object class comprises determining, based on the respective subsection information of the plurality of subsections, that the set of subsections include respective line segments associated with the object class that have directions that match; identifying, based on the respective subsection information of the set of subsections, positions of the representative points of the respective line segments of the set of subsections; and processing the positions of the representative points of the respective line segments of the set of subsections to identify the line associated with the object class.

As further shown in FIG. 5, process 500 may include performing one or more actions based on identifying the line associated with the object class (block 550). For example, the device may perform one or more actions based on identifying the line associated with the object class, as described above. In some implementations, performing the one or more actions comprises at least one of: rendering the line of the object class over the image on a display of the vehicle; providing, to a navigation data structure, information associated with the environment and the line for use with a navigation system; or providing, to a vehicle management data structure, the information for analysis associated with a driving behavior of a driver of the vehicle.

In some implementations, performing the one or more actions comprises identifying at least two additional lines associated with the object class that are associated with respective sets of subsections of the plurality of subsections, identifying a bounding polygon associated with the object class based on the line associated with the object class and the at least two additional lines associated with the object class, and causing the bounding polygon associated with the object class to be displayed on a display of the vehicle. Identifying the bounding polygon associated with the object class may comprise identifying a first line, a second line, and a third line of the line associated with the object class and the at least two additional lines associated with the object class, determining that a starting point of the first line coincides with an ending point of the second line, and determining that an ending point of the first line coincides with a starting point of the third line.

In some implementations, performing the one or more actions comprises identifying, based on the line associated with the object class, a bounding polygon associated with the object class, and rendering the bounding polygon over the image on a display of another device. In some implementations, performing the one or more actions comprises providing the line associated with the object class and the image for display on another device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
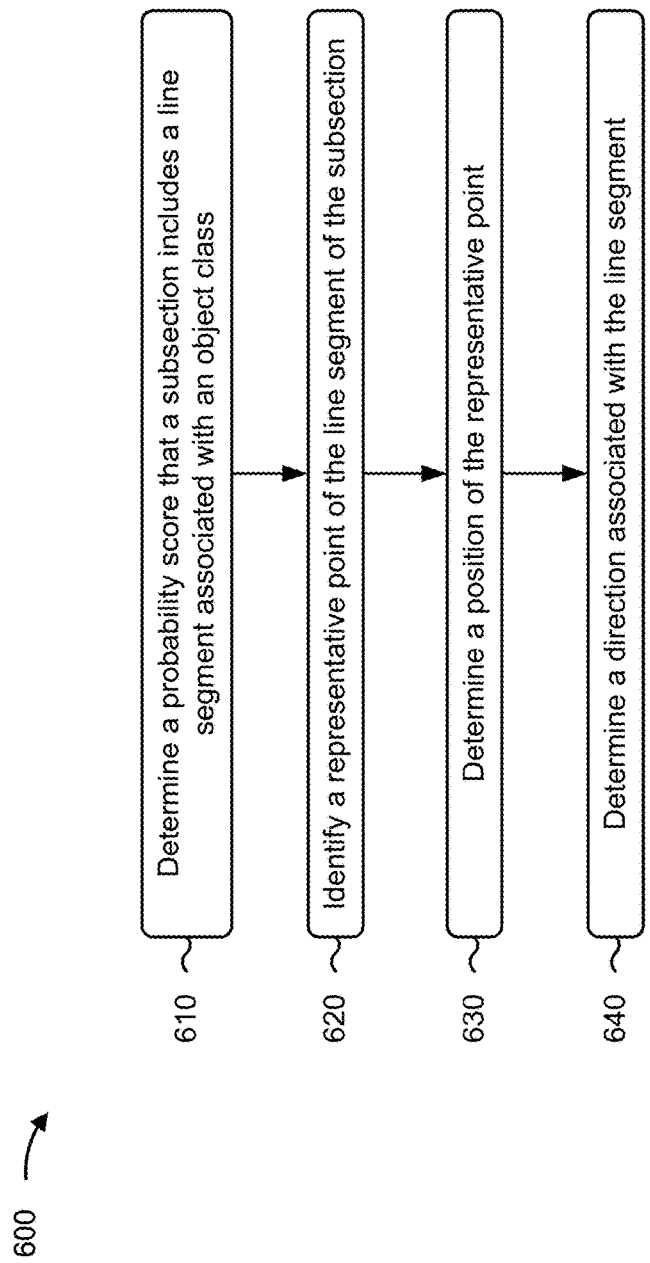

FIG. 6 is a flowchart of an example process 600 associated with systems and methods for detecting objects in an image of an environment. In some implementations, one or more process blocks of FIG. 6 may be performed by a device (e.g., vehicle environment analysis system 115). In some implementations, one or more process blocks of FIG. 6 may be performed by another device or a group of devices separate from or including the device, such as the vehicle device 105. Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include determining a probability score that a subsection includes a line segment associated with an object class (block 610). For example, the device may determine a probability score that a subsection includes a line segment associated with an object class, as described above.

As further shown in FIG. 6, process 600 may include identifying a representative point of the line segment of the subsection (block 620). For example, the device may identify a representative point of the line segment of the subsection, as described above.

As further shown in FIG. 6, process 600 may include determining a position of the representative point (block 630). For example, the device may determine a position of the representative point, as described above.

As further shown in FIG. 6, process 600 may include determining a direction associated with the line segment (block 640). For example, the device may determine a direction associated with the line segment, as described above.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
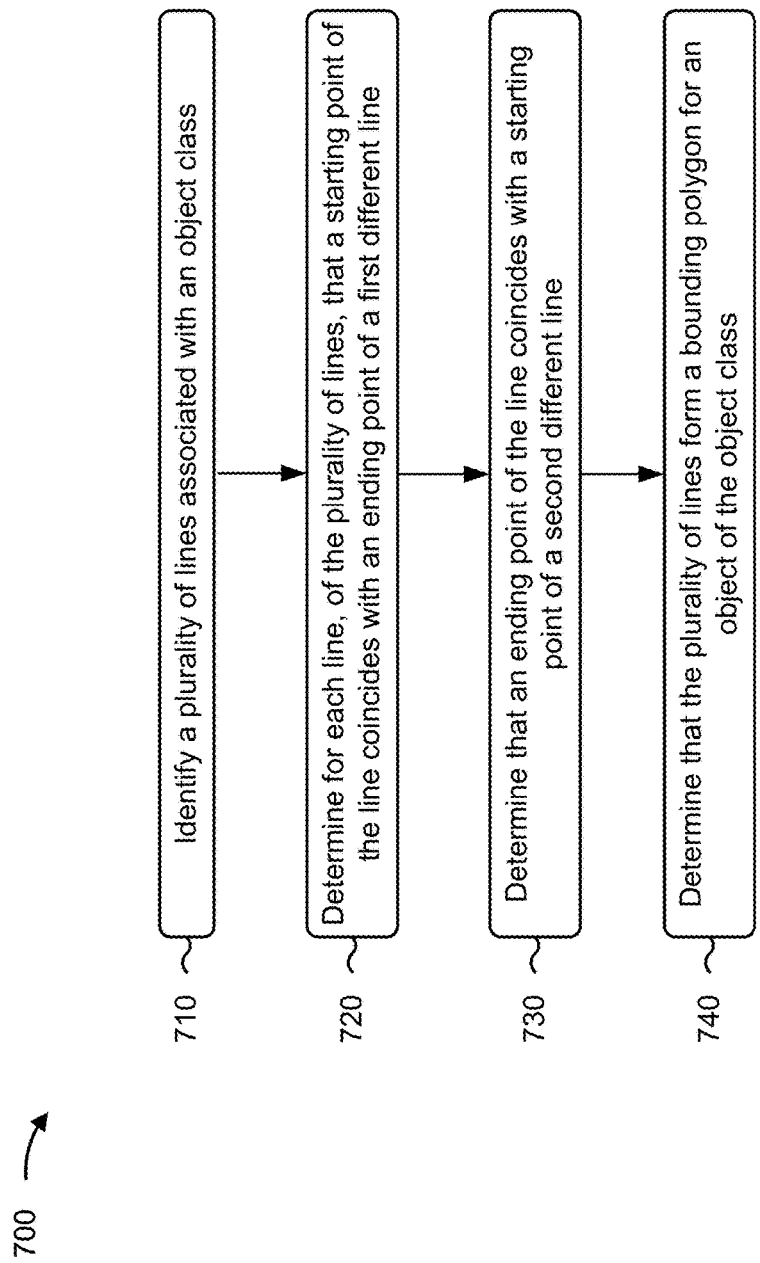

FIG. 7 is a flowchart of an example process 700 associated with systems and methods for detecting objects in an image of an environment. In some implementations, one or more process blocks of FIG. 7 may be performed by a device (e.g., vehicle environment analysis system 115). In some implementations, one or more process blocks of FIG. 7 may be performed by another device or a group of devices separate from or including the device, such as the vehicle device 105. Additionally, or alternatively, one or more process blocks of FIG. 7 may be performed by one or more components of device 400, such as processor 420, memory 430, storage component 440, input component 450, output component 460, and/or communication component 470.

As shown in FIG. 7, process 700 may include identifying a plurality of lines associated with an object class (block 710). For example, the device may identify a plurality of lines associated with an object class, as described above.

As further shown in FIG. 7, process 700 may include determining for each line, of the plurality of lines, that a starting point of the line coincides with an ending point of a first different line (block 720). For example, the device may determine for each line, of the plurality of lines, that a starting point of the line coincides with an ending point of a first different line, as described above.

As further shown in FIG. 7, process 700 may include determining that an ending point of the line coincides with a starting point of a second different line (block 730). For example, the device may determine that an ending point of the line coincides with a starting point of a second different line, as described above.

As further shown in FIG. 7, process 700 may include determining that the plurality of lines form a bounding polygon for an object of the object class (block 740). For example, the device may determine that the plurality of lines form a bounding polygon for an object of the object class, as described above.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, an image that depicts an environment associated with a vehicle;
   partitioning, by the device, the image into a plurality of subsections;
   analyzing, by the device, the plurality of subsections to determine respective subsection information of the plurality of subsections,
      wherein subsection information, for an individual subsection, indicates:
         a probability score that the subsection includes a line segment associated with an object class,
         a position of a representative point of the line segment, and
         a direction of the line segment;
   determining, by the device and based on the respective subsection information of the plurality of subsections, respective affinity levels of the plurality of subsections;
   identifying, by the device based on aggregating the respective affinity levels of the plurality of subsections, a set of subsections of the plurality of subsections;
   identifying, by the device and based on positions of points of the set of subsections, a line associated with the object class that is associated with the set of subsections of the plurality of subsections; and
   performing, by the device, one or more actions based on identifying the line associated with the object class.

2. The method of claim 1, wherein the plurality of subsections are analyzed using a machine learning model that is trained based on images that depict various vehicle environments.

3. The method of claim 1, wherein the object class is associated with at least one of the following objects:
   a lane marking;
   a road edge;
   a road curb; or
   a highway shoulder.

4. The method of claim 1, wherein identifying the line associated with the object class comprises:
   determining, based on the respective subsection information of the plurality of subsections, that the set of subsections include respective line segments associated with the object class that have directions that match;
   identifying, based on the respective subsection information of the set of subsections, positions of the representative points of the respective line segments of the set of subsections; and
   processing the positions of the representative points of the respective line segments of the set of subsections to identify the line associated with the object class.

5. The method of claim 1, wherein performing the one or more actions comprises at least one of:
   rendering the line of the object class over the image on a display of the vehicle;
   providing, to a navigation data structure, information associated with the environment and the line for use with a navigation system; or providing, to a vehicle management data structure, the information for analysis associated with a driving behavior of a driver of the vehicle.

6. The method of claim 1, wherein performing the one or more actions comprises:
identifying at least two additional lines associated with the object class that are associated with respective sets of subsections of the plurality of subsections;
identifying a bounding polygon associated with the object class based on the line associated with the object class and the at least two additional lines associated with the object class; and
causing the bounding polygon associated with the object class to be displayed on a display of the vehicle.

7. The method of claim 6, wherein identifying the bounding polygon associated with the object class comprises:
identifying a first line, a second line, and a third line of the line associated with the object class and the at least two additional lines associated with the object class;
determining that a starting point of the first line coincides with an ending point of the second line; and
determining that an ending point of the first line coincides with a starting point of the third line.

8. A device, comprising:
one or more processors configured to:
receive an image that depicts an environment associated with a vehicle;
partition the image into a plurality of subsections;
analyze, using a machine learning model, the plurality of subsections to determine respective subsection information of the plurality of subsections;
determine, based on the respective subsection information, respective affinity levels of the plurality of subsections;
identify, based on aggregating the respective affinity levels of the plurality of subsections, a set of subsections of the plurality of subsections;
identify, based on positions of points of the set of subsections, a line associated with an object class that is associated with the set of subsections of the plurality of subsections; and
perform one or more actions based on identifying the line associated with the object class.

9. The device of claim 8, wherein the object class is associated with at least one of the following objects:
another vehicle;
a road sign;
a street sign;
an exit sign; or
a traffic light.

10. The device of claim 8, wherein the one or more processors, when analyzing the plurality of subsections to determine the respective subsection information, are configured to:
process a subsection, of the plurality of subsections, using the machine learning model to determine a probability score that the subsection includes a line segment associated with the object class.

11. The device of claim 8, wherein the one or more processors, when analyzing the plurality of subsections to determine the respective subsection information, are configured to:
process a subsection using the machine learning model to determine a probability score that the subsection includes a line segment associated with the object class;
identify, based on the probability score satisfying a threshold, a representative point of the line segment in the subsection; and
determine a position of the representative point of the line segment in relation to a reference point of the subsection.

12. The device of claim 8, wherein the one or more processors, when analyzing the plurality of subsections to determine the respective subsection information, are configured to:
process a subsection using the machine learning model to determine that a line segment associated with the object class exists in the subsection;
determine a position of a representative point of the line segment within the subsection; and
determine a direction associated with the line segment.

13. The device of claim 12, wherein the one or more processors, when determining the direction associated with the line segment, are configured to:
determine a position of an additional point of the line segment within the subsection; and
determine the direction associated with the line segment based on a difference between the position of the representative point and the position of the additional point.

14. The device of claim 8, wherein the line associated with the object class is a best fit line associated with representative points of respective line segments associated with the object class that are included in the set of subsections.

15. The device of claim 8, wherein the one or more processors, when performing the one or more actions, are configured to:
identify, based on the line associated with the object class, a bounding polygon associated with the object class; and
render the bounding polygon over the image on a display of the vehicle.

16. A non-transitory computer-readable medium storing instructions, the instructions comprising:
one or more instructions that, when executed by one or more processors of a device, cause the device to:
receive an image that depicts an environment;
partition the image into a plurality of subsections;
analyze, using a machine learning model, the plurality of subsections to determine respective subsection information of the plurality of subsections;
determine, based on the respective subsection information, respective affinity levels of the plurality of subsections;
identify, based on aggregating the respective affinity levels of the plurality of subsections, a set of subsections of the plurality of subsections;
identify, based on positions of points of the set of subsections, at least one line associated with an object class that is associated with the set of subsections of the plurality of subsections; and
perform one or more actions based on identifying the at least one line associated with the object class.

17. The non-transitory computer-readable medium of claim 16, wherein the one or more instructions that cause the device to analyze the plurality of subsections to determine the respective subsection information, cause the device to:
process a subsection, of the plurality of subsections, to determine for the subsection at least one of:
a probability score that the subsection includes a line segment associated with the object class, a position of a representative point of the line segment, or a direction of the line segment.

18. The non-transitory computer-readable medium of claim 16, wherein the one or more instructions that cause the device to perform the one or more actions, cause the device to:

identifying a bounding polygon associated with the object class based on the at least one line associated with the object class; and causing the bounding polygon associated with the object class and the image to be displayed on a display of another device.

19. The non-transitory computer-readable medium of claim 16, wherein the one or more instructions that cause the device to perform the one or more actions, cause the device to:

provide the at least one line associated with the object class and the image for display on another device.

20. The method of claim 1, wherein the object class is associated with at least one of the following objects:

another vehicle;
a road sign;
a street sign;
an exit sign; or
a traffic light.

* * * * *